United States Patent
Xu

(10) Patent No.: US 9,671,909 B2
(45) Date of Patent: Jun. 6, 2017

(54) MUTUAL CAPACITANCE ONE GLASS SOLUTION TOUCH PANEL AND MANUFACTURE METHOD THEREOF

(71) Applicant: Shenzhen China Star Optoelectronics Technology Co., Ltd., Shenzhen, Guangdong (CN)

(72) Inventor: Xiangyang Xu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 153 days.

(21) Appl. No.: 14/425,611

(22) PCT Filed: Nov. 21, 2014

(86) PCT No.: PCT/CN2014/091886
§ 371 (c)(1),
(2) Date: Mar. 3, 2015

(87) PCT Pub. No.: WO2016/074275
PCT Pub. Date: May 19, 2016

(65) Prior Publication Data
US 2016/0342234 A1    Nov. 24, 2016

(30) Foreign Application Priority Data

Nov. 14, 2014 (CN) .......................... 2014 1 0650119

(51) Int. Cl.
G06F 3/045 (2006.01)
G06F 3/044 (2006.01)

(52) U.S. Cl.
CPC .... *G06F 3/044* (2013.01); *G06F 2203/04103* (2013.01); *G06F 2203/04111* (2013.01)

(58) Field of Classification Search
CPC ...................................................... G06F 3/044
USPC ............ 345/156–184; 349/12; 324/537, 551; 361/749
See application file for complete search history.

(56) References Cited

U.S. PATENT DOCUMENTS

| 2008/0043196 A1* | 2/2008 | Fujita | G02F 1/1345 349/152 |
| 2009/0322702 A1* | 12/2009 | Chien | G06F 3/0412 345/174 |
| 2011/0050617 A1* | 3/2011 | Murphy | G06F 3/0418 345/174 |
| 2011/0216035 A1* | 9/2011 | Shih | G06F 3/045 345/174 |

(Continued)

Primary Examiner — Prabodh M Dharia
(74) Attorney, Agent, or Firm — Andrew C. Cheng

(57) ABSTRACT

The present invention provides a mutual capacitance one glass solution touch panel and a manufacture method thereof. A first through hole and a second through hole are formed at an isolation layer of the touch panel. A first sub electrode pattern of the touch panel is electrically connected to a fourth sub electrode pattern of the touch panel via the first through hole, and a third sub electrode pattern of the touch panel is electrically connected to a second sub electrode pattern of the touch panel via the second through hole as touch control test is performed. According to the aforesaid arrangement, the present invention is capable of reducing the wire resistance of the transmission signals in the electrode patterns to raise the touch control sensitivity.

17 Claims, 3 Drawing Sheets

(56) References Cited

U.S. PATENT DOCUMENTS

| | | | |
|---|---|---|---|
| 2012/0113050 A1* | 5/2012 | Wang | G06F 3/0412 345/174 |
| 2012/0133613 A1* | 5/2012 | Chen | G06F 3/044 345/174 |
| 2013/0038547 A1* | 2/2013 | Lin | G06F 3/041 345/173 |
| 2013/0320994 A1* | 12/2013 | Brittain | G06F 3/0416 324/537 |
| 2013/0328812 A1* | 12/2013 | Kim | G06F 3/044 345/173 |
| 2014/0035860 A1* | 2/2014 | Wong | G06F 3/044 345/174 |
| 2014/0055402 A1* | 2/2014 | Cok | G06F 3/0412 345/174 |
| 2014/0192490 A1* | 7/2014 | Taylor | H01R 31/005 361/749 |
| 2014/0347319 A1* | 11/2014 | Lin | G06F 3/044 345/174 |
| 2015/0185900 A1* | 7/2015 | Ye | G06F 3/044 349/12 |
| 2015/0277655 A1* | 10/2015 | Kim | G06F 3/0412 345/174 |
| 2015/0355257 A1* | 12/2015 | Wu | G01R 31/025 324/551 |
| 2016/0018946 A1* | 1/2016 | Hotelling | G06F 3/0418 345/174 |
| 2016/0041638 A1* | 2/2016 | Xie | G06F 3/041 345/173 |

* cited by examiner

MUTUAL CAPACITANCE ONE GLASS SOLUTION TOUCH PANEL AND MANUFACTURE METHOD THEREOF

FIELD OF THE INVENTION

The present invention relates to a touch screen technology field, and more particularly to a mutual capacitance one glass solution touch panel and a manufacture method thereof.

BACKGROUND OF THE INVENTION

With the development of touch screen technology and higher demands of the market to the thin touch screen, the mutual capacitance one glass solution touch panel possesses advantages of strong anti-interference capability, high sensitivity, distinguishable multi-touch, et cetera has become the major lead of the touch screen technology field.

The mutual capacitance one glass solution touch panel is also so called unified mutual capacitance touch panel. Fringing field capacitors can be formed at the fringes of different electrode patterns of the only glass substrate. When the touch control is functioning, the fringing field capacitor can change. By detecting the transmitting signals of the sensing lines and the emitting lines, the coordinates of the touch point can be located. Nevertheless, the present emitting lines and sensing lines are both formed with ITO (Indium-Tin Oxide) transparent conductive material. The resistance of the ITO transparent conductive material is too big which can extremely easily make the transmitting signals of the sensing lines and the emitting lines seriously decayed and distorted. Consequently, it leads to tremendous decrease of the touch control sensitivity. For now, the touch control sensitivity can be raised by enlarging the current. However, the increase of the current will certainly add power consumption.

SUMMARY OF THE INVENTION

On this account, the technical issue to be solved by the embodiment of the present invention is to provide a mutual capacitance one glass solution touch panel and a manufacture method thereof capable of reducing the wire resistance of the transmission signals in the electrode patterns to raise the touch control sensitivity.

For solving the aforesaid technical issue, a technical solution employed by the present invention is: to provide a touch panel, and the touch panel comprises a substrate, and a first electrode pattern, an isolation layer and a second electrode pattern sequentially stacked on the substrate, wherein the first electrode pattern comprises a first sub electrode pattern and a second sub electrode pattern which are simultaneously formed on the substrate and located with a space in between, and the second electrode pattern comprises a third sub electrode pattern and a fourth sub electrode pattern which are simultaneously formed on the isolation layer and located with a space in between, and the first sub electrode pattern extends along a first direction, and the third sub electrode pattern extends along a second direction, and the first direction and the second direction are perpendicular to each other, and the first sub electrode pattern and the third sub electrode pattern crisscross with each other, and a first through hole and a second through hole are formed at the isolation layer, and the first sub electrode pattern is electrically connected to the fourth sub electrode pattern via the first through hole, and the third sub electrode pattern is electrically connected to the second sub electrode pattern via the second through hole as touch control test is performed; wherein the first sub electrode pattern comprises a stick shaped fifth sub electrode pattern and a sixth sub electrode pattern connected to the fifth sub electrode pattern, and the third sub electrode pattern comprises a stick shaped seventh sub electrode pattern and an eighth sub electrode pattern connected to the seventh sub electrode pattern, and the sixth sub electrode pattern and the eighth sub electrode pattern interlace with each other, and the sixth sub electrode pattern is electrically connected to the fourth sub electrode pattern via the first through hole, and the eighth sub electrode pattern is electrically connected to the second sub electrode pattern via the second through hole as touch control test is performed.

The second sub electrode pattern, the fourth sub electrode pattern, the sixth sub electrode pattern and the eighth sub electrode pattern are rhombus shaped, and across corners of the sixth sub electrode pattern are on the fifth sub electrode pattern, and across corners of the eighth sub electrode pattern are on the seventh sub electrode pattern.

An area of the second sub electrode pattern is smaller than an area of the eighth sub electrode pattern, and an area of the fourth sub electrode pattern is smaller than an area of the sixth sub electrode pattern.

Inwalls of the first through hole and the second through hole are formed with concave-convex structures, and electrode material is attached to the concave-convex structures as sputtering the second electrode pattern.

For solving the aforesaid technical issue, another technical solution employed by the present invention is: to provide a touch panel, and the touch panel comprises a substrate, and a first electrode pattern, an isolation layer and a second electrode pattern sequentially stacked on the substrate, wherein the first electrode pattern comprises a first sub electrode pattern and a second sub electrode pattern which are located with a space in between, and the second electrode pattern comprises a third sub electrode pattern and a fourth sub electrode pattern which are located with a space in between, and the first sub electrode pattern and the third sub electrode pattern crisscross with each other, and a first through hole and a second through hole are formed at the isolation layer, and the first sub electrode pattern is electrically connected to the fourth sub electrode pattern via the first through hole, and the third sub electrode pattern is electrically connected to the second sub electrode pattern via the second through hole as touch control test is performed.

The first sub electrode pattern comprises a stick shaped fifth sub electrode pattern and a sixth sub electrode pattern connected to the fifth sub electrode pattern, and the third sub electrode pattern comprises a stick shaped seventh sub electrode pattern and an eighth sub electrode pattern connected to the seventh sub electrode pattern, and the sixth sub electrode pattern and the eighth sub electrode pattern interlace with each other, and the sixth sub electrode pattern is electrically connected to the fourth sub electrode pattern via the first through hole, and the eighth sub electrode pattern is electrically connected to the second sub electrode pattern via the second through hole as touch control test is performed.

The second sub electrode pattern, the fourth sub electrode pattern, the sixth sub electrode pattern and the eighth sub electrode pattern are rhombus shaped, and across corners of the sixth sub electrode pattern are on the fifth sub electrode pattern, and across corners of the eighth sub electrode pattern are on the seventh sub electrode pattern.

An area of the second sub electrode pattern is smaller than an area of the eighth sub electrode pattern, and an area of the fourth sub electrode pattern is smaller than an area of the sixth sub electrode pattern.

The first sub electrode pattern extends along a first direction, and the third sub electrode pattern extends along a second direction, and the first direction and the second direction are perpendicular to each other.

The first sub electrode pattern and the second sub electrode pattern are simultaneously formed on the substrate, and the third sub electrode pattern and the fourth sub electrode pattern are simultaneously formed on the isolation layer.

Inwalls of the first through hole and the second through hole are formed with concave-convex structures, and electrode material is attached to the concave-convex structures as sputtering the second electrode pattern.

For solving the aforesaid technical issue, another technical solution employed by the present invention is: to provide a manufacture method, comprising: forming a first electrode layer on a substrate; implementing first etching to the first electrode layer to form a first electrode pattern, and the first electrode pattern comprises a first sub electrode pattern and a second sub electrode pattern which are located with a space in between; forming an isolation layer on the substrate where the first electrode layer is formed; implementing second etching to the isolation layer to form a first through hole and a second through hole; forming a second electrode layer on the isolation layer; implementing third etching to the second electrode layer to form a second electrode pattern, and the second electrode pattern comprises a third sub electrode pattern and a fourth sub electrode pattern which are located with a space in between; wherein the first sub electrode pattern and the third sub electrode pattern crisscross with each other, and the first sub electrode pattern is electrically connected to the fourth sub electrode pattern via the first through hole, and the third sub electrode pattern is electrically connected to the second sub electrode pattern via the second through hole as touch control test is performed.

The first sub electrode pattern comprises a stick shaped fifth sub electrode pattern and a sixth sub electrode pattern connected to the fifth sub electrode pattern, and the third sub electrode pattern comprises a stick shaped seventh sub electrode pattern and an eighth sub electrode pattern connected to the seventh sub electrode pattern, and the sixth sub electrode pattern and the eighth sub electrode pattern interlace with each other, and the sixth sub electrode pattern is electrically connected to the fourth sub electrode pattern via the first through hole, and the eighth sub electrode pattern is electrically connected to the second sub electrode pattern via the second through hole as touch control test is performed.

The second sub electrode pattern, the fourth sub electrode pattern, the sixth sub electrode pattern and the eighth sub electrode pattern are rhombus shaped, and across corners of the sixth sub electrode pattern are on the fifth sub electrode pattern, and across corners of the eighth sub electrode pattern are on the seventh sub electrode pattern.

An area of the second sub electrode pattern is smaller than an area of the eighth sub electrode pattern, and an area of the fourth sub electrode pattern is smaller than an area of the sixth sub electrode pattern.

The first sub electrode pattern extends along a first direction, and the third sub electrode pattern extends along a second direction, and the first direction and the second direction are perpendicular to each other.

The first electrode layer, the isolation layer and the second electrode layer are formed by sputtering.

With the aforesaid technical solutions, the benefits of the present invention are: the embodiment of the present invention forms the first through hole and the second through hole at an isolation layer, the first sub electrode pattern is electrically connected to the fourth sub electrode pattern via the first through hole, and the third sub electrode pattern is electrically connected to the second sub electrode pattern via the second through hole as touch control test is performed to the touch panel. The formations of the first through hole and the fourth sub electrode pattern are equivalent to adding a wiring layer of transmitting signals for the first sub electrode pattern. The formations of the second through hole and the second sub electrode pattern are equivalent to adding a wiring layer of transmitting signals for the third sub electrode pattern. Accordingly, the wire resistance of the transmission signals in the electrode patterns can be reduced to raise the touch control sensitivity.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are merely part of embodiments of the present invention, but not all embodiments. Based on the embodiments of the present invention, all other embodiments to those of ordinary skill in the premise of no creative efforts obtained, should be considered within the scope of protection of the present invention.

Figure 1:
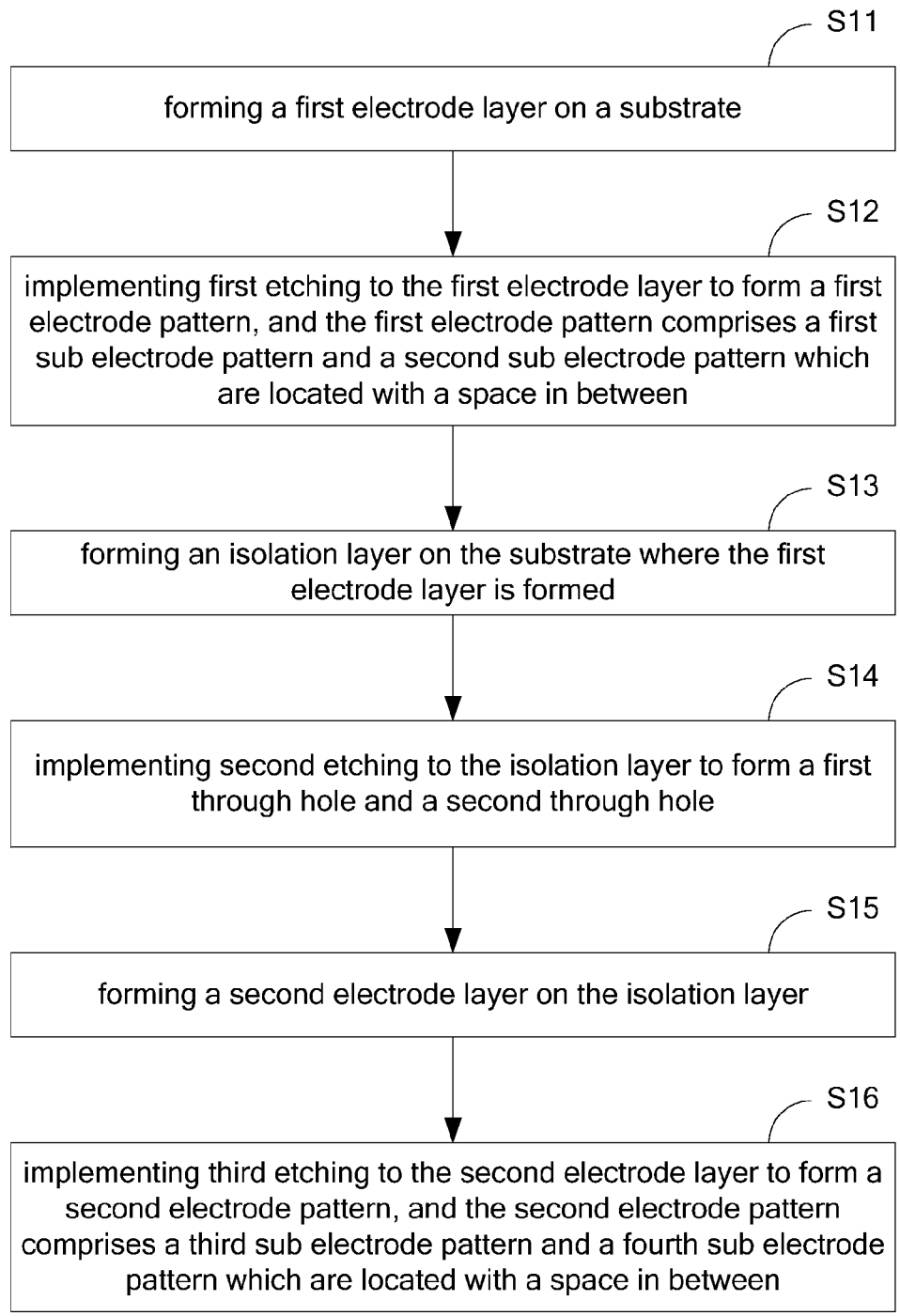
FIG. 1 is a flowchart of a manufacture method of a touch panel according to the preferred embodiment of the present invention.

FIG. 1 is a flowchart of a manufacture method of a touch panel according to the preferred embodiment of the present invention. Please refer to FIG. 1. The manufacture method of the embodiment comprises:

Step S11: forming a first electrode layer on a substrate.

The substrate can be a transparent glass substrate, a transparent plastic substrate or a transparent flexible substrate. The first electrode layer can be an Indium Tin Oxide (ITO) glass layer or other material, such as silicon oxide. In this embodiment, a manufacture material with smaller resistance is preferably employed for the first electrode layer.

Step S12: implementing first etching to the first electrode layer to form a first electrode pattern, and the first electrode pattern comprises a first sub electrode pattern and a second sub electrode pattern which are located with a space in between.

The first etching can be but not restricted as:

First, a photoresist layer is coated on the first electrode layer. Then, the exposure technology using the cover plate (so called mask) is employed for the photoresist layer to perform the first mask process for forming the exposed portion and the unexposed portion required in the mask process; ultimately, the photoresist layer is employed as etching stopper. By etching, the exposed portion of the first electrode layer is removed to obtain the first electrode pattern.

Figure 2:
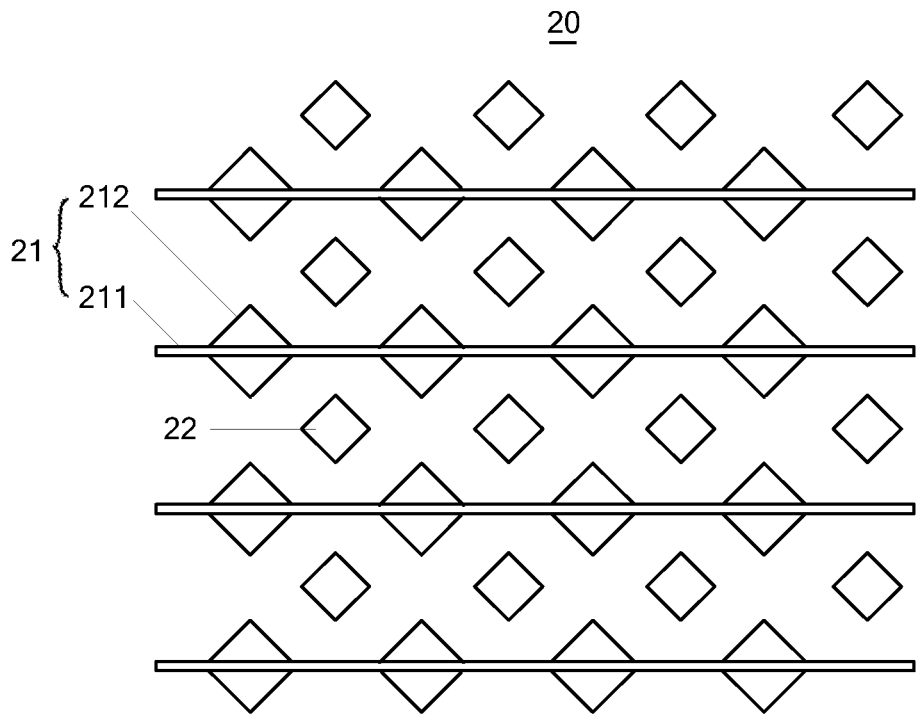
FIG. 2 is a diagram of a first electrode pattern formed by the manufacture method shown in FIG. 1.

In combination of what is shown in FIG. 2, the formed first electrode pattern 20 corresponds to the unexposed portion. The first electrode pattern 20 comprises a first sub electrode pattern 21 and a second sub electrode pattern 22 which are located with a space in between. The space between the first sub electrode pattern 21 and the second sub electrode pattern 22 corresponds to the exposed portion. The first sub electrode pattern 21 comprises a stick shaped fifth sub electrode pattern 211 and a sixth sub electrode pattern 212 connected to the fifth sub electrode pattern 211. Preferably, the second sub electrode pattern 22 and the sixth sub electrode pattern 212 are rhombus shaped in this embodiment. The across corners of the sixth sub electrode pattern 212 are on the fifth sub electrode pattern 22. Both the sixth sub electrode pattern 212 and the second sub electrode pattern 22 are aligned in array and interlace with each other. Distances between the all second sub electrode pattern 22 and the adjacent sixth sub electrode pattern 212 are the same.

Step S13: forming an isolation layer on the substrate where the first electrode layer is formed.

The isolation layer can be composed with dielectric material, such as silicon nitride, silicon oxide layer or silicon oxynitride and formed by chemical vapor deposition, sputtering or deposition of other thin film technology.

Step S14: implementing second etching to the isolation layer to form a first through hole and a second through hole.

The principle of the second etching can be referred to the first etching. The repeated description is omitted here.

Figure 3:
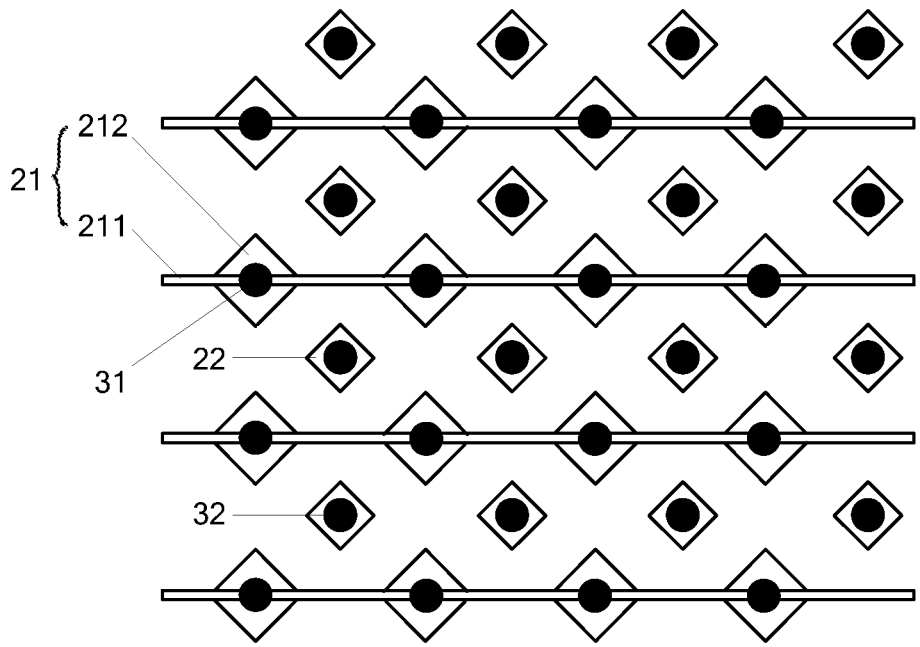
FIG. 3 is a diagram of a first through hole and a second through hole formed by the manufacture method shown in FIG. 1.

Furthermore, in combination of what is shown in FIG. 3. Along the eye line direction perpendicular to the touch panel, the first through hole 31 corresponds to the sixth sub electrode pattern 212 and the second through hole 32 corresponds to the second sub electrode pattern 22.

Step S15: forming a second electrode layer on the isolation layer.

The same material as that of the first electrode layer 112 can be used for the second electrode layer 114 or different material can be used. That is, an Indium Tin Oxide (ITO) glass layer or silicon oxide can be considered. Preferably, a manufacture material with smaller resistance is preferably employed for the second electrode layer.

Step S16: implementing third etching to the second electrode layer to form a second electrode pattern, and the second electrode pattern comprises a third sub electrode pattern and a fourth sub electrode pattern which are located with a space in between.

The principle of the third etching can be referred to the first or second etching. The repeated description is omitted here.

Figure 4:
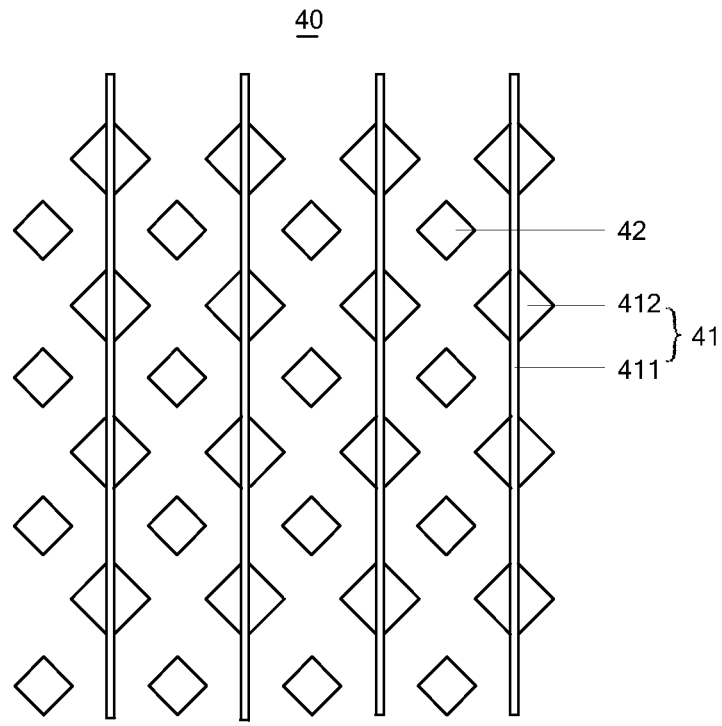
FIG. 4 is a diagram of a second electrode pattern formed by the manufacture method shown in FIG. 1.

Please refer to FIG. 4. The second electrode pattern 40 comprises a third sub electrode pattern 41 and a fourth sub electrode pattern 42 which are located with a space in between. The third sub electrode pattern 41 comprises a stick shaped seventh sub electrode pattern 411 and an eighth sub electrode pattern 412 connected to the seventh sub electrode pattern 411. Preferably, the fourth sub electrode pattern 42 and the sixth sub electrode pattern 212 are rhombus shaped in this embodiment. The across corners of the eighth sub electrode pattern 412 are on the seventh sub electrode pattern 411. Both the eighth sub electrode pattern 412 and the fourth sub electrode pattern 42 are aligned in array and interlace with each other. Distances between the all fourth sub electrode pattern 42 and the adjacent eighth sub electrode pattern 412 are the same.

Figure 5:
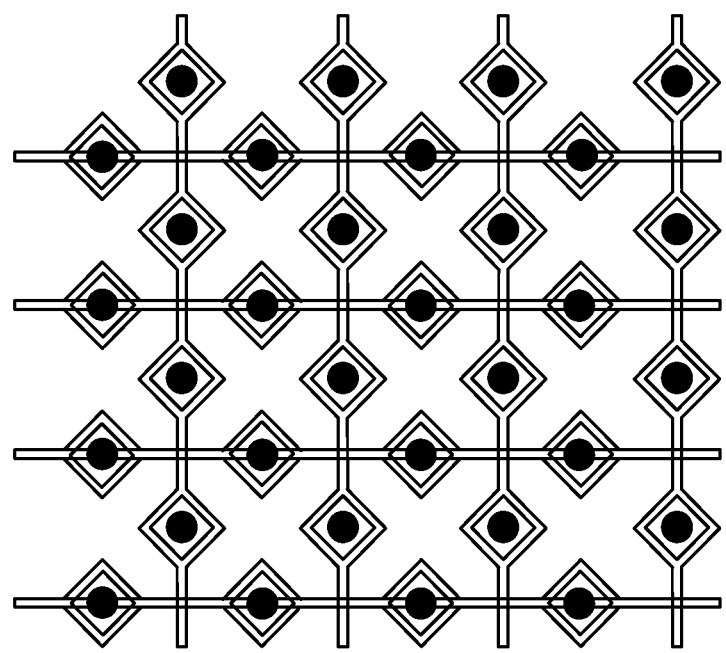
FIG. 5 is a top view diagram of the electrode patterns of the touch panel according to the preferred embodiment of the present invention.

Please combine what are shown in FIG. 3, FIG. 4 and FIG. 5. Along the eye line direction perpendicular to the touch panel, the first through hole 31 corresponds to the sixth sub electrode pattern 212, and the fourth sub electrode pattern 42. The second through hole 32 corresponds to the second sub electrode pattern 22 and the eighth sub electrode pattern 412. The fifth sub electrode pattern 211 and the seventh sub electrode pattern 411 crisscross with each other. The sixth sub electrode pattern 212 is electrically connected to the fourth sub electrode pattern 42 via the first through hole 31, and the eighth sub electrode pattern 212 is electrically connected to the second sub electrode pattern 22 via the second through hole 32 as touch control test is performed to achieve that the first sub electrode pattern 21 is electrically connected to the fourth sub electrode pattern 42 via the first through hole 31, and the third sub electrode pattern 41 is electrically connected to the second sub electrode pattern 22 via the second through hole 32.

In this embodiment, the first sub electrode pattern 21 can be considered as the emitting lines of the mutual capacitance one glass solution touch panel. The third sub electrode pattern 41 can be considered as the sensing lines of the mutual capacitance one glass solution touch panel. Then, the formations of the first through hole 31 and the fourth sub electrode pattern 42 are equivalent to adding a wiring layer of transmitting signals for the first sub electrode pattern 21 (the first electrode pattern 20). The formations of the second through hole 32 and the second sub electrode pattern 22 are equivalent to adding a wiring layer of transmitting signals for the third sub electrode pattern 41 (the second electrode pattern 40). Accordingly, the wire resistance of the transmission signals in the electrode patterns can be reduced to raise the touch control sensitivity.

The present invention further provides a mutual capacitance one glass solution touch panel, comprising a substrate, and a first electrode pattern, an isolation layer and a second electrode pattern sequentially stacked on the substrate. The first electrode pattern comprises the first electrode pattern 20 shown in FIG. 2. The isolation layer comprises the first through hole 31 and the second through hole 32 shown in FIG. 3. The second electrode layer comprises the second electrode pattern 40 shown in FIG. 4.

It is understandable that the primary objective of the present invention is to form the first through hole 31 and the second through hole 32 at an isolation layer. The first sub electrode pattern 21 of the touch panel is electrically connected to the fourth sub electrode pattern 42 via the first through hole 31, and the third sub electrode pattern 41 of the touch panel is electrically connected to the second sub electrode pattern 22 via the second through hole 32 as touch control test is performed to reduce the wire resistance of the transmission signals in the electrode patterns to raise the touch control sensitivity. Accordingly, the present invention further can be arranged, for instance:

Preferably, an area of the second sub electrode pattern 22 is smaller than an area of the eighth sub electrode pattern 412, and preferably, an area of the fourth sub electrode pattern 42 is smaller than an area of the sixth sub electrode pattern 212; alternately, the first sub electrode pattern 21 extends along a first direction, and the third sub electrode pattern 41 extends along a second direction, and the first direction and the second direction are perpendicular to each other; alternately, the first sub electrode pattern 21 and the second sub electrode pattern 22 can be simultaneously or not simultaneously formed on the substrate. The third sub electrode pattern 41 and the fourth sub electrode pattern 42 can be simultaneously or not simultaneously formed on the isolation layer; furthermore, inwalls of the first through hole 31 and the second through hole 32 are formed with concave-convex structures, and electrode material is attached to the concave-convex structures as sputtering the second electrode pattern 40 to increase the wiring area of transmitting signals for the electrode patterns; either of the first electrode layer, the isolation layer and the second electrode layer can be formed by sputtering.

Once again, above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A touch panel, wherein the touch panel comprises a substrate, and a first electrode pattern, an isolation layer and a second electrode pattern sequentially stacked on the substrate, wherein the first electrode pattern comprises a first sub electrode pattern and a second sub electrode pattern which are simultaneously formed on the substrate and located with a space in between, and the second electrode pattern comprises a third sub electrode pattern and a fourth sub electrode pattern which are simultaneously formed on the isolation layer and located with a space in between, and the first sub electrode pattern extends along a first direction, and the third sub electrode pattern extends along a second direction, and the first direction and the second direction are perpendicular to each other, and the first sub electrode pattern and the third sub electrode pattern crisscross with each other, and a first through hole and a second through hole are formed at the isolation layer, and the first sub electrode pattern is electrically connected to the fourth sub electrode pattern via the first through hole, and the third sub electrode pattern is electrically connected to the second sub electrode pattern via the second through hole as touch control test is performed;

wherein the first sub electrode pattern comprises a stick shaped fifth sub electrode pattern and a sixth sub electrode pattern connected to the fifth sub electrode pattern, and the third sub electrode pattern comprises a stick shaped seventh sub electrode pattern and an eighth sub electrode pattern connected to the seventh sub electrode pattern, and the sixth sub electrode pattern and the eighth sub electrode pattern interlace with each other, and the sixth sub electrode pattern is electrically connected to the fourth sub electrode pattern via the first through hole, and the eighth sub electrode pattern is electrically connected to the second sub electrode pattern via the second through hole as touch control test is performed.

2. The touch panel according to claim 1, wherein the second sub electrode pattern, the fourth sub electrode pattern, the sixth sub electrode pattern and the eighth sub electrode pattern are rhombus shaped, and across corners of the sixth sub electrode pattern are on the fifth sub electrode pattern, and across corners of the eighth sub electrode pattern are on the seventh sub electrode pattern.

3. The touch panel according to claim 2, wherein an area of the second sub electrode pattern is smaller than an area of the eighth sub electrode pattern, and an area of the fourth sub electrode pattern is smaller than an area of the sixth sub electrode pattern.

4. The touch panel according to claim 1, wherein inwalls of the first through hole and the second through hole are formed with concave-convex structures, and electrode material is attached to the concave-convex structures as sputtering the second electrode pattern.

5. A touch panel, wherein the touch panel comprises a substrate, and a first electrode pattern, an isolation layer and a second electrode pattern sequentially stacked on the substrate, wherein the first electrode pattern comprises a first sub electrode pattern and a second sub electrode pattern which are located with a space in between, and the second electrode pattern comprises a third sub electrode pattern and a fourth sub electrode pattern which are located with a space in between, and the first sub electrode pattern and the third sub electrode pattern crisscross with each other, and a first through hole and a second through hole are formed at the isolation layer, and the first sub electrode pattern is electrically connected to the fourth sub electrode pattern via the first through hole, and the third sub electrode pattern is electrically connected to the second sub electrode pattern via the second through hole as touch control test is performed.

6. The touch panel according to claim 5, wherein the first sub electrode pattern comprises a stick shaped fifth sub electrode pattern and a sixth sub electrode pattern connected to the fifth sub electrode pattern, and the third sub electrode pattern comprises a stick shaped seventh sub electrode pattern and an eighth sub electrode pattern connected to the seventh sub electrode pattern, and the sixth sub electrode pattern and the eighth sub electrode pattern interlace with each other, and the sixth sub electrode pattern is electrically connected to the fourth sub electrode pattern via the first through hole, and the eighth sub electrode pattern is electrically connected to the second sub electrode pattern via the second through hole as touch control test is performed.

7. The touch panel according to claim 6, wherein the second sub electrode pattern, the fourth sub electrode pattern, the sixth sub electrode pattern and the eighth sub electrode pattern are rhombus shaped, and across corners of the sixth sub electrode pattern are on the fifth sub electrode pattern, and across corners of the eighth sub electrode pattern are on the seventh sub electrode pattern.

8. The touch panel according to claim 7, wherein an area of the second sub electrode pattern is smaller than an area of the eighth sub electrode pattern, and an area of the fourth sub electrode pattern is smaller than an area of the sixth sub electrode pattern.

9. The touch panel according to claim 5 or 6, wherein the first sub electrode pattern extends along a first direction, and the third sub electrode pattern extends along a second direction, and the first direction and the second direction are perpendicular to each other.

10. The touch panel according to claim 5, wherein the first sub electrode pattern and the second sub electrode pattern are simultaneously formed on the substrate, and the third sub electrode pattern and the fourth sub electrode pattern are simultaneously formed on the isolation layer.

11. The touch panel according to claim 7, wherein inwalls of the first through hole and the second through hole are formed with concave-convex structures, and electrode material is attached to the concave-convex structures as sputtering the second electrode pattern.

12. A manufacture method of a touch panel, wherein the manufacture method comprises:

forming a first electrode layer on a substrate;
implementing first etching to the first electrode layer to form a first electrode pattern, and the first electrode pattern comprises a first sub electrode pattern and a second sub electrode pattern which are located with a space in between;
forming an isolation layer on the substrate where the first electrode layer is formed;
implementing second etching to the isolation layer to form a first through hole and a second through hole;
forming a second electrode layer on the isolation layer;
implementing third etching to the second electrode layer to form a second electrode pattern, and the second electrode pattern comprises a third sub electrode pattern and a fourth sub electrode pattern which are located with a space in between;
wherein the first sub electrode pattern and the third sub electrode pattern crisscross with each other, and the first sub electrode pattern is electrically connected to the fourth sub electrode pattern via the first through hole, and the third sub electrode pattern is electrically connected to the second sub electrode pattern via the second through hole as touch control test is performed.

13. The manufacture method according to claim 12, wherein the first sub electrode pattern comprises a stick shaped fifth sub electrode pattern and a sixth sub electrode pattern connected to the fifth sub electrode pattern, and the third sub electrode pattern comprises a stick shaped seventh sub electrode pattern and an eighth sub electrode pattern connected to the seventh sub electrode pattern, and the sixth sub electrode pattern and the eighth sub electrode pattern interlace with each other, and the sixth sub electrode pattern is electrically connected to the fourth sub electrode pattern via the first through hole, and the eighth sub electrode pattern is electrically connected to the second sub electrode pattern via the second through hole as touch control test is performed.

14. The manufacture method according to claim 13, wherein the second sub electrode pattern, the fourth sub electrode pattern, the sixth sub electrode pattern and the eighth sub electrode pattern are rhombus shaped, and across corners of the sixth sub electrode pattern are on the fifth sub electrode pattern, and across corners of the eighth sub electrode pattern are on the seventh sub electrode pattern.

15. The manufacture method according to claim 14, wherein an area of the second sub electrode pattern is smaller than an area of the eighth sub electrode pattern, and an area of the fourth sub electrode pattern is smaller than an area of the sixth sub electrode pattern.

16. The manufacture method according to claim 12 or 13, wherein the first sub electrode pattern extends along a first direction, and the third sub electrode pattern extends along a second direction, and the first direction and the second direction are perpendicular to each other.

17. The manufacture method according to claim 12, wherein the first electrode layer, the isolation layer and the second electrode layer are formed by sputtering.

* * * * *